Aug. 29, 1944.   E. B. LEAR   2,357,012
CAPSTAN
Filed May 4, 1942

INVENTOR
EARL B. LEAR
BY
ATTORNEY

Patented Aug. 29, 1944

2,357,012

UNITED STATES PATENT OFFICE 2,357,012

CAPSTAN

Earl B. Lear, Garfield Heights, Ohio, assignor, by mesne assignments, to The Cleveland Pneumatic Tool Company, Cleveland, Ohio, a corporation of Ohio Application May 4, 1942, Serial No. 441,647

3 Claims. (Cl. 254—183)

This invention relates to improvements in capstans. While it may have more general application, the invention is intended primarily for use upon hoists that are employed in mining operations for actuating scrapers. In certain respects the invention constitutes an improvement upon that disclosed in my copending application, Serial No. 418,777, filed November 12, 1941, which became abandoned October 5, 1942.

One of the objects of the invention is the provision in a hoist unit of a capstan conveniently arranged for manipulation by the operator of the hoist for shifting a remote cable pulley so that the path of the scraper may swing through an arc centered at the hoist.

Another object is the provision of capstan mechanism so designed and arranged as to be readily dismounted or disassembled from above, and one in which the actuation of the sheave and the locking of the same against rotation are adapted to be readily accomplished by the operator.

Other objects and features of novelty will appear as I proceed with the description of that embodiment of the invention which, for the purposes of the present application, I have illustrated in the accompanying drawing, in which Fig. 1 is a partial side elevational view of a hoist embodying my improved capstan.

Figure 1:
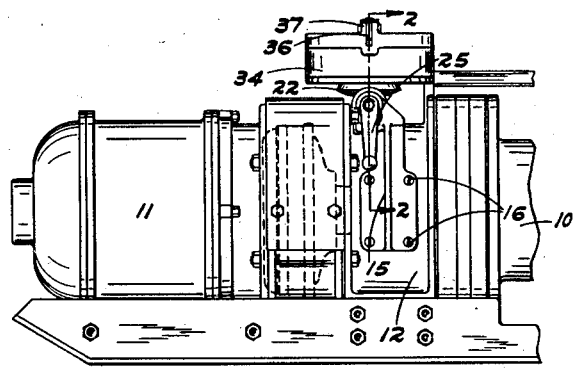

In the unit illustrated in Fig. 1, one or more hoist drums 10 are adapted to be coupled through gearing, not shown, with the shaft of an electric motor 11. A portion of the housing of this unit, shown at 12, carries a bracket having a vertical arm 15 secured to the housing by screws 16 and a horizontal arm 17, attached to the housing by a stud 18 or the like.

In this bracket there is rigidly mounted a short shaft 19 which is prevented from turning by any suitable means. Upon a flat part of the bracket surrounding the bore for shaft 19 there is a bearing plate 20 which may be held against rotation by a pin 21 or the like. A bevel gear 22 rests upon plate 20 and is adapted to revolve around shaft 19. It meshes with a bevel pinion 23 that is pinned to a short shaft 24 journaled in plain bearings in the bracket and provided with a hand crank 25 on its outer end. It will be apparent that a mechanical advantage is gained because of the relative proportions of the gears 22 and 23.

Figures 2, 3, 4:
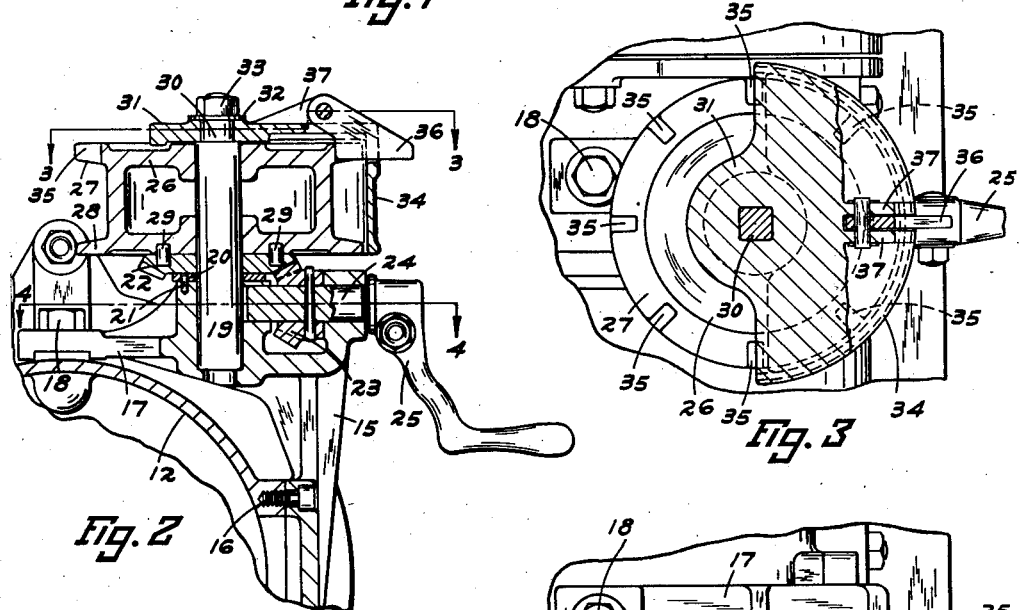
Fig. 2 is a detail sectional view of a larger scale, the view being taken substantially on the line 2—2 of Fig. 1.
Fig. 3 is a horizontal sectional view taken substantially on the line 3—3 of Fig. 2.
Fig. 4 is a cross sectional view taken substantially on the line 4—4 of Fig. 2.

A sheave 26 with upper and lower flanges 27 and 28 surrounds shaft 19 loosely and rests upon the gear 22 to which it is joined for rotation by one or more pins 29. Just above sheave 26 shaft 19 is reduced and squared as indicated at 30. A horizontal portion 31 of a guard member has a square hole which fits over squared portion 30 of the shaft and is thereby prevented from turning. The horizontal portion 31 lies substantially parallel to the hub of the sheave as clearly shown in Fig. 2 of the drawing, and is clamped in place by a washer 32 and nut 33, the latter being threaded upon the upper threaded extremity of the shaft 19. This guard member has also an annular vertical wall 34 which extends about half way around the sheave close enough to the flanges 27 and 28 to prevent a cable from running out of the groove of the sheave. It will be apparent that the guard member, the sheave, the bevel gear 22 and the bearing plate 20 may be withdrawn in that order after the nut 33 and washer 32 are removed from the upper end of shaft 19.

Figure 5:
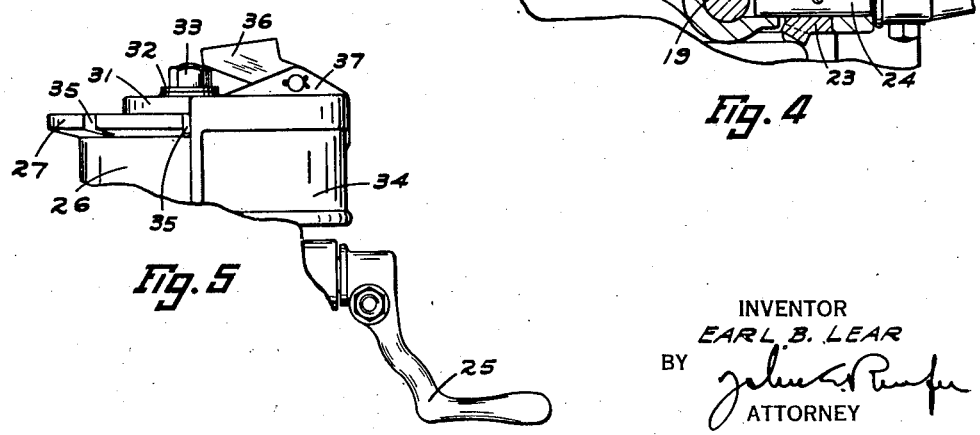
Fig. 5 is a fragmental elevational view showing the sheave guard and showing the latch for the sheave in its inoperative position.

The upper flange 27 of the sheave is provided with notches 35 at regular intervals throughout its periphery, any one of which notches is adapted to receive a latch 36 that is pivotally mounted between ears 37 integral with the horizontal portion 31 of the guard member. A suitable slot is provided in the horizontal and vertical portions of the guard member to receive the latch when it is in operative position. The walls of this slot give the latch a rigid support against any strain which may be imposed upon it by a tendency of the sheave to move in one direction or the other. The latch remains in either its operative position of Fig. 2 or its inoperative position of Fig. 5 by gravity. In fact if the crank handle is stopped in its uppermost position the latch may be operated by the thumb or forefinger of the same hand that manipulates the crank.

Having thus described my invention I claim:

1. A device of the character described comprising, a bracket adapted to be attached to a hoist housing, a vertical shaft rigidly supported in said bracket, a capstan sheave mounted for rotation on said shaft, means associated with said shaft for rotating said sheave, and a cable guard fixed upon the upper end of said shaft and closing a portion of the periphery of said sheave.

2. A device of the character described comprising, a bracket adapted to be detachably connected to a hoist housing, said bracket having a vertical and horizontal arm, a shaft rigidly supported in said horizontal arm and extending vertically therefrom, a capstan sheave having a hub mounted for rotation on said shaft, a cable guard including a horizontal portion secured to the upper end of said shaft and disposed substantially parallel to the hub of said capstan, and an annular vertical wall forming a part of said guard for closing a portion of the periphery of said sheave.

3. In combination with a hoist having a plurality of drums horizontally disposed within a housing, of a capstan sheave mounted on a shaft extending vertically relative to said drums, said capstan sheave having a hub arranged at right angles to the axes of said drums, a bracket for detachably connecting said capstan sheave to the hoist housing, a cable guard including a horizontal plate mounted on said shaft above said capstan sheave and disposed substantially parallel to said hub, and an annular vertical wall depending from said plate and forming a part of said guard for enclosing a portion of the periphery of said capstan sheave.

EARL B. LEAR.